Aug. 2, 1927.
O. J. CAMERON
CHUCK
Filed Jan. 28, 1926
1,637,436
2 Sheets-Sheet 1
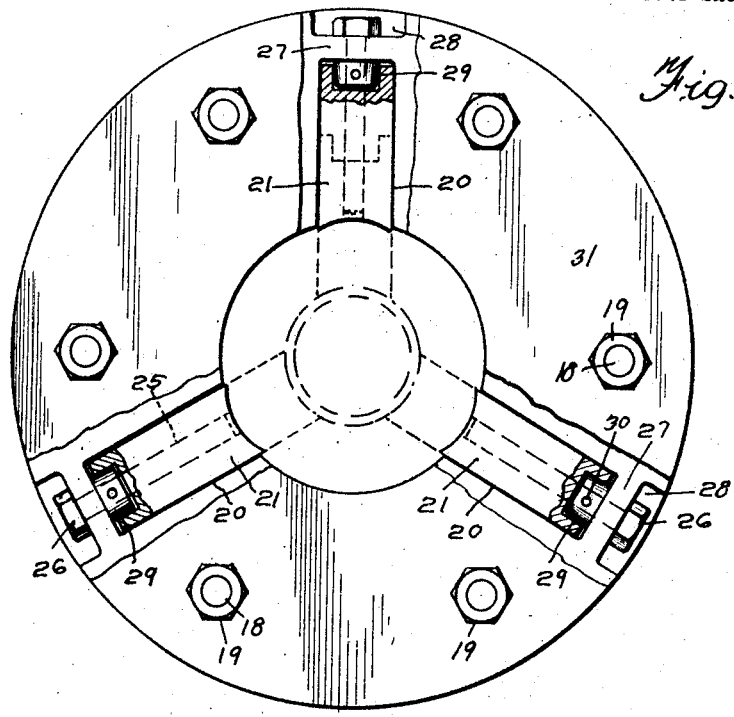
Fig. 1.
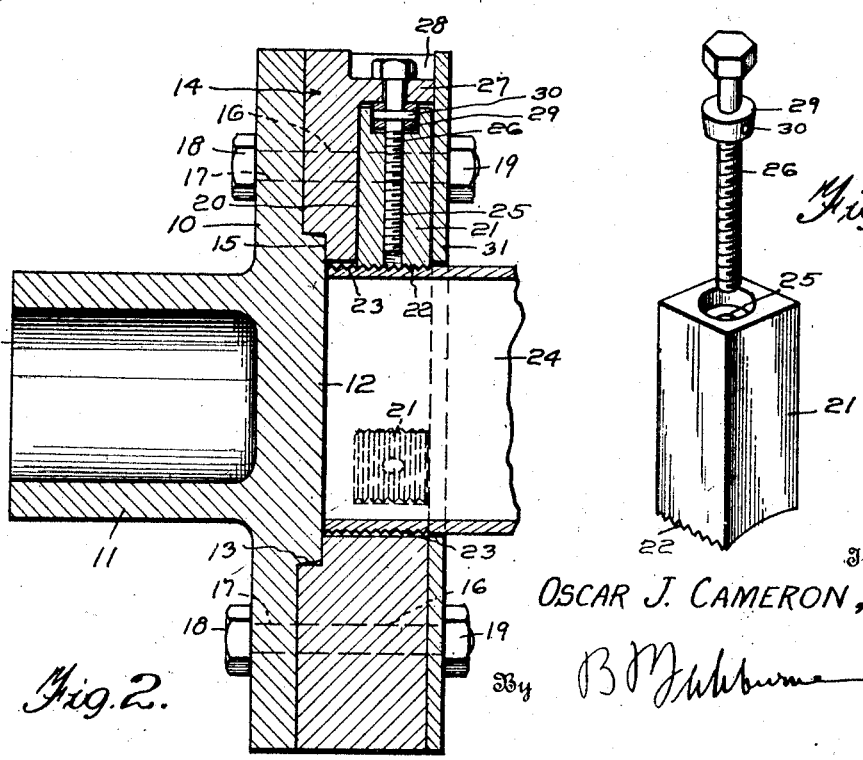
Fig. 2.
Fig. 3.
Inventor
OSCAR J. CAMERON,
By
Attorney Aug. 2, 1927.
O. J. CAMERON
1,637,436
CHUCK
Filed Jan. 28, 1926
2 Sheets-Sheet 2
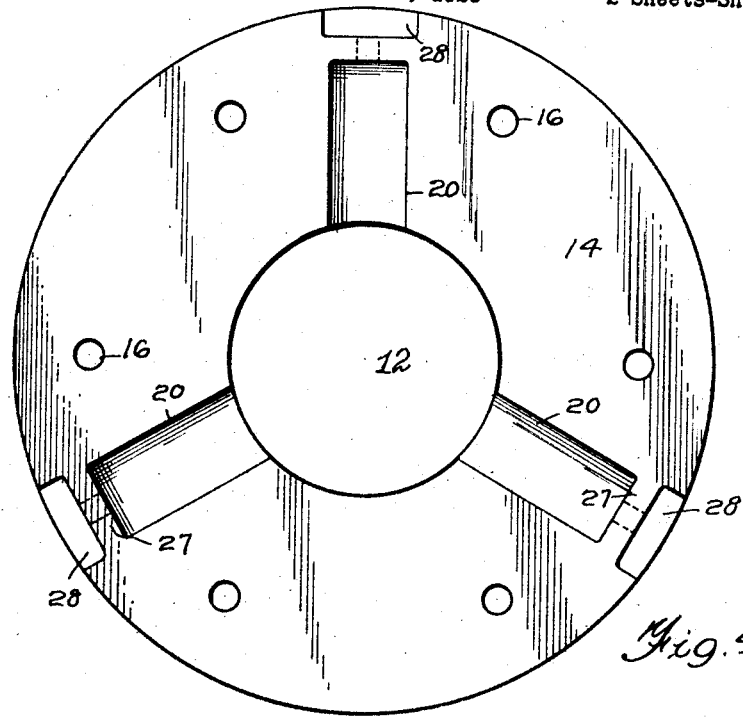
Fig. 4.
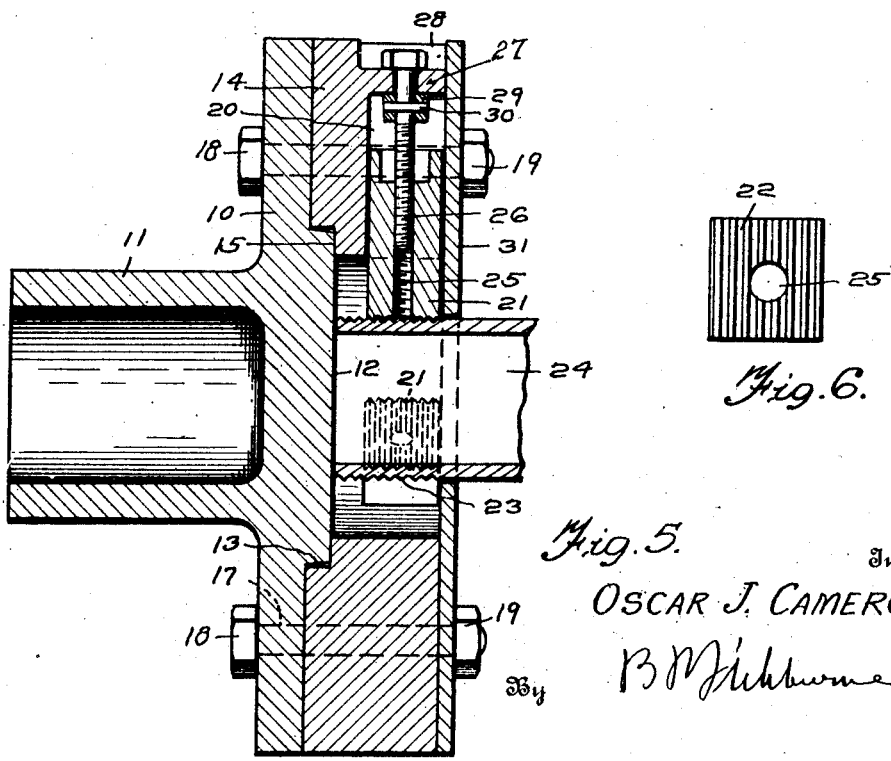
Fig. 5.
Fig. 6.
Inventor
OSCAR J. CAMERON,
By
Attorney Patented Aug. 2, 1927.

1,637,436

UNITED STATES PATENT OFFICE.

OSCAR J. CAMERON, OF LULING, TEXAS.

CHUCK.

Application filed January 28, 1926. Serial No. 84,462.

My invention relates to a chuck device.

My invention embodies a chuck device, which is adapted to be mounted upon the usual chuck of a lathe or screw machine, although the same may be mounted in a vise or the like. My improved chuck is particularly designed for holding the screw-threaded ends of nipples, while the opposite ends are being threaded, and to so hold the nipples without liability of injury to the held screw-threaded ends. My device is simple in construction, and embodies only three major parts. The device is easy to adjust and will hold the work in a powerful manner.

In the accompanying drawings forming a part of this specification, and in which like numerals are employed to designate like parts throughout the same, Figure 1 is a side elevation of a chuck embodying my invention, Figure 2 is a transverse section taken on line 2—2 of Figure 1, showing the chuck device holding a large nipple, Figure 3 is a perspective view of one of the jaws, Figure 4 is a side elevation of the holding member, Figure 5 is a transverse section, taken on the same line 2—2 of Figure 1, but showing the chuck device holding a smaller nipple, and, Figure 6 is a plan view of one of the jaws.

In the drawings, wherein for the purpose of illustration, are shown preferred embodiments of my invention, the numeral 10 designates a preferably circular head or body portion of the chuck device, provided with a shank 11, preferably formed integral therewith, although it may be rigidly attached thereto by any suitable means. The shank 11 is adapted to be held within the chuck of a lathe or screw machine, or a vise. The head 10 is provided upon its front side with a preferably circular raised jam face 12, the periphery 13 of which is preferably slightly tapered.

The numeral 14 designates a preferably annular holder, provided upon its rear side with an annular recess 15, to receive the raised face 12. This annular holder is provided with spaced transverse openings 16, adapted for alinement with openings 17, formed in the head 10, and these openings receive clamping bolts 18, having nuts 19. The forward side of the annular holder 14 is provided with radial recesses 20, within which are slidably mounted radial jaws 21. The inner ends of these jaws are provided with screw-threads 22, adapted to mesh with the screw-threads 23 upon the nipple 24, the forward end of which is to be screw-threaded.

The jaws 21 are provided with longitudinal screw-threaded openings 25, for receiving the screw-threaded portions of adjusting bolts 26. The smooth portions of these adjusting bolts are rotatable within openings formed in webs 27 of the holder 14, and there are recesses 28 positioned outwardly of these webs. The heads of the bolts 26 are located within these recesses and may be turned by a suitable wrench. The relative longitudinal movement of these adjusting bolts is prevented by means of stop collars 29, mounted upon the outer portions of the bolts and clamped thereby by screws 30 or the like.

The numeral 31 designates a combined clamp and jam, which is preferably annular, and has openings for the passage of the bolts 18.

As shown in Figure 2, the nipple 23 is of the maximum diameter that the chuck device will receive. The nuts 19 may be suitably unscrewed so that the parts are somewhat loosened up and the screw-threaded end of the nipple is inserted into the chuck device. The jaws 21 are now moved inwardly until their screw-threaded ends mesh with the screw threads of the nipple. The nipple may be turned so that it will be screwed into the chuck device, and its inner end will clamp against the jam face 12. The plate 31 will also have slidable contact with the periphery of the nipple, and it is thus seen that the jam face 12 and the plate 31 will serve to hold the nipple against perceptible lateral movement, and much of the strain will be taken from the jaws 21. This is desirable as it is essential that the nipples be held without injury to the screw-threaded ends thereof. When the nuts 19 are screwed up tightly, the bolts 18 will clamp the holder 14 to the head 10, and the plate 31 will also clamp against the jaws 21, holding them against longitudinal movement.

In Figure 5, I have shown the chuck as holding a smaller nipple. The jaws 21 are projected inwardly further, but the nipple is held in a similar manner, and its inner end is clamped against the jam face 12. The plate 31 has a correspondingly smaller bore so that it will slidably contact with the periphery of the nipple, as shown.

It is to be understood that the forms of my invention herewith shown and described are to be taken as preferred examples of the same, and that various changes in the shape, size and arrangement of parts may be resorted to without departing from the spirit of my invention or the scope of the subjoined claims.

Having thus described my invention, what I claim is:

1. A chuck device for holding the screw-threaded ends of nipples, comprising a head having a rigid jam face and radial guide means arranged about the jam face and positioned near the same, radial jaws slidably mounted within the radial guide means and having their inner ends screw-threaded to mesh with the threads of the nipple, such inner screw-threaded ends being adapted to assume different radial positions with respect to said jam face, and means to positively radially adjust said jaws.

2. A chuck device for holding the screw-threaded ends of nipples, comprising a head having an inner jam face, a separate holding member mounted upon the head and having an inner opening for exposing the jam face, slidable jaws mounted upon the holding member in a group surrounding the inner opening and having their inner ends threaded to engage the threads of the nipple, a combined jam and clamp plate mounted upon the holding member clamping against said jaws and having an inner opening leading into the first named inner opening said opening of the jam and clamp plate being of a proper size to receive the work with the work substantially contacting with the wall of said opening, and means for binding the head, holding member, and combined jam and clamp plate together, the arrangement being such that the nipple may be turned while in engagement with the screw-threaded jaws whereby its end may clamp against the jam face and its periphery may engage with the wall of the inner opening of the combined jam and clamp plate.

3. A chuck device for holding nipples or the like, comprising a head having a shank upon one side and an inner raised jam face upon the opposite side, a separate holding member having a recess to receive the inner raised jam face and having an inner opening for exposing the jam face and also having a plurality of radial recesses, jaws slidable within the recesses, means to move the jaws, a clamp plate mounted upon the side of the holding member and having an inner opening leading into the first named inner opening and adapted to exert pressure upon said jaws, and clamping means to draw the clamp plate toward the head, the arrangement being such that the end of the nipple may be brought into engagement with the jam face.

4. A chuck device for holding nipples or the like, comprising a head provided upon its rear side with a shank and upon its forward side with a raised inner portion forming a shoulder, a holding member mounted upon the forward side of the head and having a recess upon its inner side to receive the shoulder and upon its forward side with a plurality of radial recesses which extend through the forward face thereof, said holding member having integral webs at the outer ends of the radial recesses, jaws slidable within the radial recesses, adjusting bolts having screw-threaded engagement with the jaws and rotatable within openings in the webs, said bolts having heads arranged outwardly of the webs, collars detachably rigidly mounted upon the bolts beneath the webs, a clamp plate mounted upon the forward side of the holding member and contacting with the sides of the jaws, and clamping bolts passing through the head, holding member and clamp plate.

5. A chuck of the character described, comprising a head having a shank, a holding member mounted thereon and provided upon one face with radial recesses having corresponding sides open, jaws slidable within the recesses and having their inner ends threaded to mesh with the threads of the nipple, adjusting bolts engaging the jaws and having a swiveled connection with the holding member, a clamp plate mounted upon the holding member and adjacent to the open sides of the recesses and adapted to have engagement with the sides of the jaws, and means to draw the plate toward the head.

6. A chuck device of the character described, comprising a head provided with a holding member having radial recesses which have corresponding sides open, jaws slidable within the recesses and having their inner ends threaded to mesh with the threads of the nipple, means to adjust the jaws, a separate plate mounted upon the holding member and adapted to have an engagement with the sides of the jaws, said plate having an opening which is adapted to receive the work with the work contacting with the wall of its opening, and means to draw the plate toward the head.

7. A chuck device of the character described, comprising a head having a jam face, jaws mounted upon the head and surrounding the jam face and having their inner ends threaded to mesh with the threads of the nipple, a jam plate detachably mounted upon the head in spaced relation to the jam face and having an opening formed therein arranged opposite said jam face, said opening being of a size to receive the nipple with the nipple contacting with the wall of such opening, the arrangement being such that the nipple may be turned while in engagement with the screw-threaded jaws for bringing its end into clamping engagement with the jam face while the nipple is steadied at a point remote from the jam face by engagement with the wall of the opening in said plate.

8. A chuck device of the character described, comprising a rotatable head having a jam face, radially adjustable jaws mounted upon the head and surrounding the jam face and having their inner ends threaded to mesh with the threads of the nipple, radial adjusting bolts carried by the head and engaging the jaws to positively effect their adjustments, and a part rigidly carried by the head and spaced a substantial distance from the jam face, said part having an opening for the passage of the nipple, said opening being of such a size that its wall contacts with the nipple, the arrangement being such that the nipple may be turned while engaging with the screw-threaded jaws for bringing its ends into clamping engagement with the jam face while the nipple is further steadied at a point remote from the jam face by engagement with the wall of said opening.

In testimony whereof I affix my signature.

OSCAR J. CAMERON.